United States Patent
Freudenberger et al.

(10) Patent No.: US 9,512,040 B2
(45) Date of Patent: Dec. 6, 2016

(54) ROTARY ANODE AND METHOD FOR PRODUCING A BASE BODY FOR A ROTARY ANODE

(71) Applicants: Joerg Freudenberger, Kalchreuth (DE); Stefan Lampenscherf, Poing (DE); Gia Khanh Pham, Charlotte, NC (US); Steffen Walter, Oberpframmern (DE)

(72) Inventors: Joerg Freudenberger, Kalchreuth (DE); Stefan Lampenscherf, Poing (DE); Gia Khanh Pham, Charlotte, NC (US); Steffen Walter, Oberpframmern (DE)

(73) Assignee: Siemens Aktiengesellschaft, München (DE)

( * ) Notice: Subject to any disclaimer, the term of this patent is extended or adjusted under 35 U.S.C. 154(b) by 215 days.

(21) Appl. No.: 13/623,300

(22) Filed: Sep. 20, 2012

(65) Prior Publication Data
US 2013/0070904 A1 Mar. 21, 2013

(30) Foreign Application Priority Data
Sep. 20, 2011 (DE) .................. 10 2011 083 064

(51) Int. Cl.
*H01J 35/10* (2006.01)
*C04B 35/565* (2006.01)
*C04B 35/575* (2006.01)

(52) U.S. Cl.
CPC .......... *C04B 35/565* (2013.01); *C04B 35/575* (2013.01); *C04B 35/5755* (2013.01); *H01J 35/10* (2013.01); *C04B 2235/3813* (2013.01); *C04B 2235/604* (2013.01); *C04B 2235/666* (2013.01); *C04B 2235/9607* (2013.01); *H01J 2235/081* (2013.01); *H01J 2235/086* (2013.01)

(58) Field of Classification Search
CPC ............................. H01J 35/10; C04B 35/575
USPC ...................................................... 378/144
See application file for complete search history.

(56) References Cited

U.S. PATENT DOCUMENTS

| | | | |
|---|---|---|---|
| 4,327,186 A | 4/1982 | Murata et al. | |
| 4,735,923 A * | 4/1988 | Sugawara et al. | 501/89 |
| 4,837,231 A * | 6/1989 | Endo et al. | 501/91 |
| 5,031,201 A | 7/1991 | Gaillard et al. | |
| 5,508,118 A * | 4/1996 | Hayashi et al. | 428/610 |

(Continued)

FOREIGN PATENT DOCUMENTS

| | | |
|---|---|---|
| CN | 101779267 A | 7/2010 |
| DE | 31 23 974 A1 | 2/1982 |

(Continued)

OTHER PUBLICATIONS

Desmaison-Brut 'Mechanical Properties and Oxidation Behavior of Electroconductive Ceramic Composites' Jun. 2007, 10$^{th}$ International Conference of the European Ceramic Society, pp. 1315-1320.*

(Continued)

*Primary Examiner* — Robert Kim
*Assistant Examiner* — Eliza Osenbaugh-Stewar
(74) *Attorney, Agent, or Firm* — Lempia Summerfield Katz LLC

(57) ABSTRACT

A rotary anode for an X-ray tube includes a ceramic base body that carries a focal path for emitting X-rays during electron irradiation. The ceramic base body is made of a mixture of silicon carbide and at least one high temperature-resistant diboride.

8 Claims, 2 Drawing Sheets

(56) References Cited

U.S. PATENT DOCUMENTS

| | | | |
|---|---|---|---|
| 8,553,844 B2 | 10/2013 | Lewalter et al. | |
| 2002/0154741 A1* | 10/2002 | Rigali et al. | 378/144 |
| 2007/0203012 A1* | 8/2007 | Oda et al. | 501/87 |
| 2007/0270302 A1* | 11/2007 | Zhang et al. | 501/92 |
| 2010/0027754 A1* | 2/2010 | Lenz | 378/144 |
| 2011/0129068 A1* | 6/2011 | Lewalter | H01J 35/108 |
| | | | 378/127 |

FOREIGN PATENT DOCUMENTS

| | | |
|---|---|---|
| DE | 10 2009 053 636 A1 | 5/2011 |
| JP | S63174251 A | 7/1988 |

OTHER PUBLICATIONS

Peng et al., 'Oxidation Resistance of Fully Dense $ZrB_2$ with SiC, $TaB_2$, and $TaSi_2$ Additives', 2008, Journal of the American Ceramic Society, vol. 91, No. 5, pp. 1489-1494.*

German Office Action dated Jan. 12, 2012 for corresponding German Patent Application No. DE 10 2011 083 064.2 with English translation.

Chinese Office action for related Chinese Application No. 201210345107.0, dated Aug. 4, 2015, with English Translation.

* cited by examiner

ROTARY ANODE AND METHOD FOR PRODUCING A BASE BODY FOR A ROTARY ANODE

This application claims the benefit of DE 10 2011 083 064.2, filed on Sep. 20, 2011.

BACKGROUND

The present embodiments relate to a rotary anode for an X-ray tube and to a method for producing a base body for such a rotary anode.

X-ray tubes, as are used, by way of example, in medical X-ray equipment, include a cathode, from which electrons are accelerated toward a rotating rotary anode. The rotary anode includes a base body that carries a focal path made of tungsten or a tungsten-rhenium alloy, which forms the actual anode. When sufficiently accelerated electrons strike the focal path, the atoms of the focal path are excited accordingly and, consequently, imitate X-rays at the desired wavelength. Rotation of the rotary anode is intended to keep the thermal stress as low as possible in the process. Since increasingly higher radiation intensities are desired for X-ray tomography, for example, the focal spot of the electrons is to be focused as sharply as possible on the focal path and is to be as small as possible, and this leads to high power densities in the focal spot region and a high temperature development. To compensate this, high rotational speeds of the rotary anode are desired.

Known rotary anodes include a base body made of a titanium-zirconium-molybdenum alloy that has a relatively high density with a relatively low high temperature strength. Owing to the mechanical properties of such base bodies, rotational frequencies of only 200 Hz to 250 Hz may be achieved with current rotary anodes.

Base bodies made of ceramic materials are known in addition to such titanium-zirconium-molybdenum base bodies. Therefore, US 2010 002 7754, by way of example, describes a base body in the form of an anode ring for a rotary anode that is made from graphite or silicon carbide (e.g., see FIG. 1 showing a rotating anode from US 2010 002 7754 having a drive center A, a curved disc B, rigid fit elements C, an anode ring D, small pyrolytic graphite plates E, an x-ray-generating layer F, and slits G). The anode ring also includes radially oriented right-angled chambers, in which the small segments made of pyrolytic carbon may be inserted to dissipate and store the resultant heat as quickly as possible. Combinations made of molybdenum-titanium-zirconium alloys and silicon carbide are known. However, the high rotational frequencies used in modem X-ray equipment may not be achieved with materials of this kind.

SUMMARY AND DESCRIPTION

The present embodiments may obviate one or more of the drawbacks or limitations in the related art. For example, a rotary anode that is temperature-resistant and allows rotational frequencies in the range of 300 Hz to 400 Hz is provided. As another example, a method for producing a base body for a rotary anode of this kind is also provided.

A rotary anode for an X-ray tube includes a ceramic base body that carries a focal path for emitting X-rays during electron irradiation. The base body is made of a mixture of silicon carbide and at least one high temperature-resistant diboride. In one embodiment, titanium diboride, tantalum diboride, zirconium diboride and/or hafnium diboride may be used. The diborides belong to the class of materials of the ultra-high temperature materials and have melting points of more than 3000° C. A base body of this kind may therefore withstand particularly high thermal stresses during operation of the rotary anode. Mixed silicon carbide-diboride ceramics of this kind have a very high thermal capacity, so the base body may absorb great quantities of energy during operating of the rotary anode. A high thermal conductivity remains with this class of material even in the high temperature range, so the heat may be distributed particularly well during operation, and no warping occurs.

Such mixed ceramics have thermal coefficients of expansion that lie in the range of the thermal coefficients of expansion of tungsten, so stresses do not form between the base body and the focal path.

A further advantage lies in the temperature dependency of the strength of diboride-based ceramics. A temperature range between 1000° C. and 1500° C., which is relevant to operation of such rotary anodes, even increases the strength of these ceramics with the temperature. Strength values between 450 MPa and 550 MPa may be achieved in this temperature range with conventional diboride-based ceramics. By contrast, molybdenum-titanium-zirconium alloys according to the prior art have reduced strength in this temperature range, so mechanical failure of base bodies made of known materials of this kind may occur at high rotational speeds. This is avoided with one embodiment of the diboride-based ceramic, so high rotational speeds and high energy densities may be achieved in the focal spot of the electron radiation on the focal path.

The content of the at least one diboride may be 1 to 50 percent by volume of the total volume of the base body. The diboride content may be varied depending on desired thermal coefficients of expansion for adjustment to the material of the focal path.

In one embodiment, a method for producing a base body for a rotary anode of an X-ray tube, in which a high temperature-resistant ceramic powder is pressed into a negative mold and then sintered, is provided. A ceramic powder consisting of a mixture of silicon carbide and at least one high temperature-resistant diboride is used. For example, titanium diboride, tantalum diboride, zirconium diboride or hafnium diboride may be used in this connection. The diborides may be used individually or in a mixture. A volume fraction of 1 to 50 percent by volume may be used. The advantages of diboride-based mixed ceramics of this kind are described above.

Pressure-less sintering at 2000° C. to 2300° C., spark plasma sintering at 2000° C. to 2300° C., or hot isostatic pressing at 1700° C. to 2300° C. may be suitable for sintering ceramics of this kind. Stable ceramic base bodies may be reproducibly and reliably created with all of said methods.

DETAILED DESCRIPTION OF THE DRAWINGS

Exemplary embodiments are illustrated in more detail below.

Figure 1:
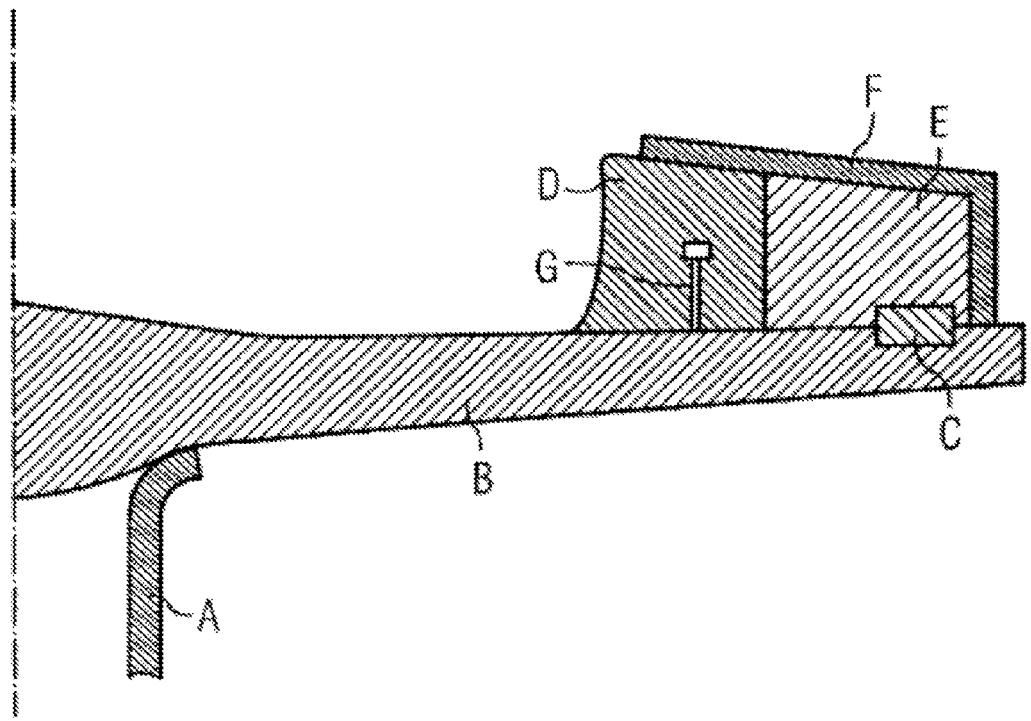
FIG. 1 shows a rotating anode plate of the prior art.
Figure 2:
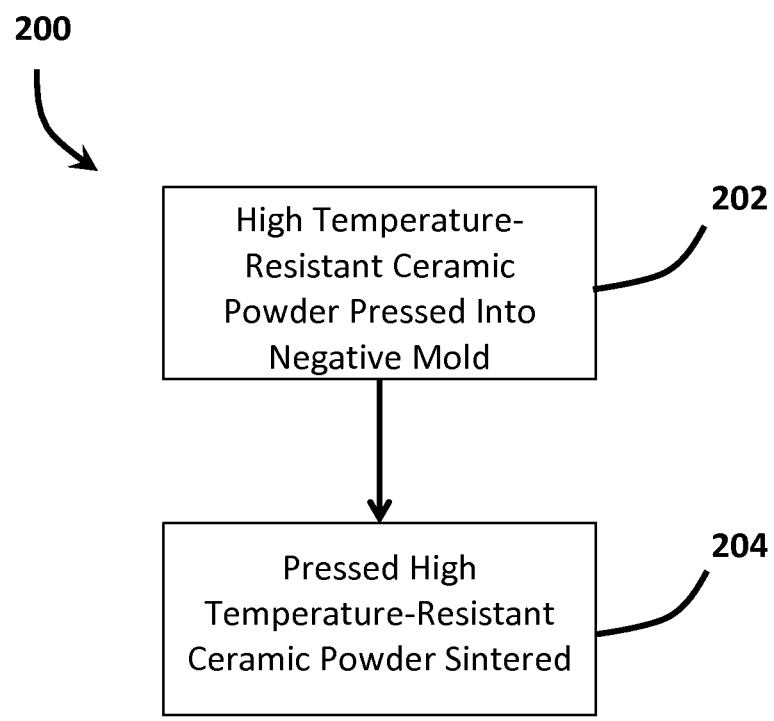
FIG. 2 shows a flowchart of one embodiment of a method for producing a base body for a rotary anode of an X-ray tube.

FIG. 2 shows a flowchart of one embodiment of a method 200 for producing a base body for a rotary anode of an X-ray tube. In act 202, a high temperature-resistant ceramic powder is pressed into a negative mold. In act 204, the pressed high temperature-resistant ceramic powder is sintered.

Mixed ceramics made of silicon carbide and high temperature-resistant diborides may be suitable for producing rotary anodes for X-ray tubes with high thermal resistance and high mechanical strength (e.g., may be used as the high temperature-resistant ceramic powder). The rotary anodes are capable of withstanding rotational frequencies of up to 400 Hz. The following exemplary embodiments are jointly discussed:

1. silicon carbide having 1 to 50 percent by volume titanium boride;
2. silicon carbide having 1 to 50 percent by volume hafnium diboride;
3. silicon carbide having 1 to 50 percent by volume zirconium diboride;
4. silicon carbide having 1 to 50 percent by volume tantalum diboride;
5. silicon carbide having a mixture of titanium boride, hafnium diboride and zirconium diboride with a volume fraction of 1-50 volume percentage in total.

Thermal coefficients of expansion of the diborides in the mixed ceramic are greater than the thermal coefficients of silicon carbide, which is $4.5 \cdot 10^{-6}$ $K^{-1}$ at 1000° C.

By adding the diborides to silicon carbide, the thermal coefficients of expansion of the mixed ceramic may be raised, and the corresponding conditions may be adjusted.

The diborides also have a high thermal capacity $C_P$ (1500° C.) of more than 0.85 J/(gK). This is advantageous during operation of the rotary anode, since the large quantities of energy are to be absorbed per X-ray cycle.

One indication of the class of material is any high thermal conductivity even in the high temperature range. While many materials exhibit a clear reduction in thermal conductivity with increasing temperature, the diborides have almost constant thermal conductivity behavior in a temperature range between 500° C. and 2000° C., in which the thermal conductivity $\lambda$ is more than 75 W/mK. A clear increase in the thermal conductivity may be observed in the case of titanium boride. This has a positive effect on the heat dissipation of the rotary anode in X-ray mode.

When choosing the mixture ratio between silicon carbide and the respective diborides, the thermal coefficients of expansion of the ceramic base body of the rotary anode may be adapted to the coefficients of expansion of the focal path that is made of tungsten with 5% or 10% alloyed rhenium. In this regard, a coefficient of expansion of 5.2 to $6 \cdot 10^{-6}$ $K^{-1}$ may be reached. Adapting the thermal coefficients of expansion prevents stresses building up between the material of the ceramic base body and of the focal path during the heating phase. These stresses may lead to flaking of the focal path.

The mixture ratio may also be chosen, such that the specific thermal capacity $C_P$ is sufficient to absorb the energy introduced into the rotary anode during an X-ray cycle. Values of about 1.1 J/(gK) may, for example, be achieved, and this does not reach the thermal capacity of graphite or pyrolytic graphite ($C_P$>1.9 J/(gK)) but is much higher than the specific thermal capacity of titanium-zirconium-molybdenum alloys (e.g., about 0.25 J/(gK)).

A further advantage of the ceramics lies in a much improved thermal conductivity compared with conventional materials (e.g., molybdenum-titanium-zirconium or pyrographite). In contrast to these materials, the thermal conductivity of such mixed ceramics remains constant at approximately 60 W/mK for the silicon carbide matrix or 75 W to 80 W/mK for the embedded diborides even in a temperature range between 1000° C. and 1500° C. This provides a constant removal of heat during X-ray mode and prevents heat build-up.

The mechanical strength of the ceramics is also much improved compared with conventional materials. Tests on conventional rotary anodes show catastrophic failure of the rotary anodes may start due to the high density of the molybdenum-titanium-zirconium material and the high loss in strength thereof in the temperature range between 1000° C. 1500° C. at rotational frequencies of more than 250 Hz. Mechanical calculations confirm this pattern of failure.

Rotary anodes made of silicon carbide with the addition of diborides exhibit constant or even increasing strength values at increasing temperatures. In a temperature range between 1000° C. and 1500° C., strength values between 450 MPa and 550 MPa may therefore be achieved. In conjunction with the low density of the silicon carbide-diboride mixed ceramics, these high strengths allow a clear increase in the rotational frequency of the rotary anode to values between 300 Hz and 400 Hz and allow design variations with much greater disc diameters of the rotary anode.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A rotary anode for an X-ray tube, the rotary anode comprising:
    a ceramic base body that carries a focal path for emitting X-rays during electron irradiation,
    wherein the ceramic base body comprises a mixture of silicon carbide and 1-50 total volume percentage of high temperature-resistant diborides,
    wherein the high-temperature-resistant diborides comprise $TaB_2$, and
    wherein the rotary anode is rotatable at a rotational frequency of 300 Hz-400 Hz at an operating temperature of 1000° C.-1500° C.

2. The rotary anode as claimed in claim 1, wherein the high temperature-resistant diborides further comprise $TiB_2$.

3. The rotary anode as claimed in claim 1, wherein the ceramic base body has a thermal coefficient of expansion of $5.2 \cdot 10^{-6}$ $K^{-1}$ to $6 \cdot 10^{-6}$ $K^{-1}$.

4. The rotary anode as claimed in claim 1, wherein a thermal coefficient of expansion of the ceramic base body is adapted to a thermal coefficient of expansion of the focal path.

5. The rotary anode as claimed in claim 4, wherein the focal path comprises tungsten and 5-10 wt. % alloyed rhenium.

6. The rotary anode as claimed in claim 4, wherein the thermal coefficient of expansion of the ceramic base body is $5.2 \cdot 10^{-6}$ $K^{-1}$ to $6 \cdot 10^{-6}$ $K^{-1}$.

7. The rotary anode as claimed in claim 1, wherein the ceramic base body has a specific thermal capacity of 1.1 J/gK.

8. The rotary anode as claimed in claim 1, wherein the ceramic base body has a thermal conductivity of 75-80 W/mK at the operating temperature of 1000° C.-1500° C.

* * * * *